US011938482B2

(12) United States Patent
Jung

(10) Patent No.: US 11,938,482 B2

(45) Date of Patent: Mar. 26, 2024

(54) VIAL CAP FOR A LIQUID CHROMATOGRAPHY SAMPLE VIAL

(71) Applicant: Waters Technologies Corporation, Milford, MA (US)

(72) Inventor: Moon Chul Jung, Waltham, MA (US)

(73) Assignee: Waters Technologies Corporation, Milford, MA (US)

(*) Notice: Subject to any disclaimer, the term of this patent is extended or adjusted under 35 U.S.C. 154(b) by 182 days.

(21) Appl. No.: 17/335,373

(22) Filed: Jun. 1, 2021

(65) Prior Publication Data

US 2022/0203360 A1 Jun. 30, 2022

Related U.S. Application Data

(60) Provisional application No. 63/034,050, filed on Jun. 3, 2020.

(51) Int. Cl.
*B01L 3/00* (2006.01)

(52) U.S. Cl.
CPC ... *B01L 3/50825* (2013.01); *B01L 2200/0689* (2013.01); *B01L 2200/142* (2013.01); *B01L 2300/042* (2013.01); *B01L 2300/0832* (2013.01)

(58) Field of Classification Search
CPC ......... B01L 3/50825; B01L 2200/0689; B01L 2200/142; B01L 2300/042; B01L 2300/0832
See application file for complete search history.

(56) References Cited

U.S. PATENT DOCUMENTS

| | | | | |
|---|---|---|---|---|
| 4,098,419 A * | 7/1978 | Virog, Jr. | B65D 55/024 215/901 |
| 11,498,725 B1 * | 11/2022 | Field | B01L 3/50853 |
| 2006/0043106 A1 * | 3/2006 | Pottish | B65D 35/44 222/92 |
| 2010/0111772 A1 * | 5/2010 | Hartofelis | B01L 3/523 422/400 |
| 2015/0266630 A1 * | 9/2015 | Scott | B65B 7/2828 215/331 |

* cited by examiner

*Primary Examiner* — Jill A Warden
*Assistant Examiner* — Alex Ramirez
(74) *Attorney, Agent, or Firm* — WOMBLE BOND DICKINSON (US) LLP; Deborah M. Vernon

(57) ABSTRACT

A vial cap for a sample vial includes a cylindrical cap body defining a first circular opening at a first end. The vial cap also includes a cap lid extending radially inward from a second end of the cylindrical cap body. The cap lid defines a second circular opening. The vial cap also includes a septum located within the cylindrical cap body and in contact with the cap lid. The septum spans the second circular opening defined by the cap lid portion. The vial cap also includes a number of flexible threads extending from an internal surface of the cylindrical cap body.

14 Claims, 5 Drawing Sheets

VIAL CAP FOR A LIQUID CHROMATOGRAPHY SAMPLE VIAL

CROSS-REFERENCE TO RELATED APPLICATIONS

This application claims benefit and priority to U.S. Provisional Application No. 63/034,050 filed Jun. 3, 2020, entitled "VIAL CAP FOR A LIQUID CHROMATOGRAPHY SAMPLE VIAL" The content of which is incorporated herein by reference in its entirety.

TECHNICAL FIELD

The present disclosure relates to vial caps and, in particular, to caps for sealing sample vials in liquid chromatography (LC) systems.

BACKGROUND

In typical LC workflows, samples are stored in small glass or polypropylene vials before being injected to a LC column. These small vials can be sealed with twist caps or push-on caps to prevent evaporation. Twist caps offer tighter closure than push-on caps and provide more consistent results from repeated injections from a single vial. Twist caps have internal threads and only match with vials that have compatible thread patterns on the mouth of the vial. Push-on caps can be easy to seal but difficult to remove, and they likewise mate only with vials designed to receive push-on caps. Most push-on caps do not have a septum, and thus a punctured push-on cap would not protect a sample from evaporation. Although twist caps provide better results, they require more effort to close than a push-on cap, because it requires typically a ¾ or a full rotation to secure the cap. This is a pain point for users, especially when they have to prepare many sample vials in each workflow.

SUMMARY

In general, embodiments of the present technology are directed to caps for sealing sample vials in liquid chromatography. In accordance with one aspect of the present disclosure, a vial cap is disclosed. The vial cap includes a cylindrical cap body defining a first circular opening at a first end. The vial cap also includes a cap lid portion extending radially inward from a second end of the cylindrical cap body, the cap lid portion defining a second circular opening. The vial cap also includes a septum located within the cylindrical cap body and in contact with the cap lid portion. The septum spans the second circular opening defined by the cap lid portion. The vial cap also includes flexible threads extending from an internal surface of the cylindrical cap body. In some embodiments, the flexible threads include at least two parallel threads. In some embodiments, the parallel threads are parallel to a plane in which the septum lies. In some embodiments, the parallel threads include two pairs of parallel threads displaced around the internal surface of the cylindrical cap body. In some embodiments, the parallel threads include more than two pairs of parallel threads displaced around the internal surface of the cylindrical cap body. In some embodiments, the parallel threads are configured to engage with external threads extending from a mouth of a vial when the first circular opening of the cylindrical cap body is positioned over the mouth of the vial. In some embodiments, a number of the parallel threads depends on a number of the external threads extending from the mouth of the vial. In some embodiments, a spacing between parallel threads depends on a size of the external threads extending from the mouth of the vial. In some embodiments, each of the flexible threads has a tapered cross sectional geometry as they extend radially inward, and an angle formed between a tapered surface of the flexible threads and the internal surface of the cylindrical cap body depends on a geometry of the external threads extending from the mouth of the vial. In some embodiments, each of the flexible threads has a tapered cross sectional geometry as they extend radially inward. In some embodiments, each of the flexible threads has a rounded cross sectional geometry. In some embodiments, each of the flexible threads defines an air pocket. In some embodiments, the septum and the flexible threads are formed from a single material. In some embodiments, the flexible threads are formed from a material more flexible than the septum.

In accordance with another aspect of the present disclosure, a vial cap for a sample vial is disclosed for use in liquid chromatography. The vial cap includes a cap body having a rigid cylindrical sidewall defining a first circular opening. The first circular opening is configured to receive a mouth of the sample vial, and the mouth of the sample vial includes external threads extending radially outward from the mouth. The vial cap also includes flexible ridges extending radially inward from an internal surface of the rigid cylindrical sidewall. The flexible ridges are configured to engage with the external threads of the sample vial when the mouth of the sample vial is placed within the first circular opening of the cap body. In some embodiments, a geometry of the fastening features is designed to prevent the vial cap from falling off the sample vial. In some embodiments, the flexible ridges are arranged in sets of parallel ridges disposed about the internal surface of the rigid cylindrical sidewall. In some embodiments, the vial cap also includes a septum disposed within an interior of the cap body and spanning a second circular opening defined by the cap body on an opposite side of the rigid cylindrical sidewall from the first circular opening.

In accordance with another aspect of the present disclosure, a cap for a sample vial for use in liquid chromatography is disclosed. The cap includes a rigid cylindrical cap body, and a number of substantially parallel fastening features disposed about an interior surface of the rigid cylindrical cap body. The fastening features are configured to engage with external threads extending radially outward from a mouth of the sample vial. The fastening features secure the cap to the sample vial regardless of geometry or pitch of the external threads of the sample vial. The rigid cylindrical cap body defines an opening allowing access to a septum, through which an interior of the sample vial can be accessed.

Various aspects of the present disclosure provide one or more of the following advantages. The vial cap of the present disclosure provides the benefits of a push cap to any type of sample vial, whether the sample vial is designed for a push cap or a twist cap. Using the flexible internal threads which can, the cap can engage with the threads of a sample vial designed for a twist cap be pushed on without any twisting motion. The flexible internal threads can likewise engage with the features of a sample vial designed for a push cap. When the cap needs to be removed, the cap can be easily removed by either pulling it off like a standard push cap, or rotating to follow the threads of a sample vial designed for a twist cap. Thus, the vial cap described herein combines provides an easy installation onto any type of sample vial, the sealing security provided by multiple flexible internal threads, and two options for removal from the sample vial.

Other embodiments will become apparent from the following detailed description considered in conjunction with the accompanying drawings. It is to be understood, however, that the drawings are designed as an illustration only and not as a definition of the limits of the technology.

BRIEF DESCRIPTION OF THE DRAWINGS

To assist those of skill in the art in making and using the disclosed exemplary embodiments of a diffuser assembly, reference is made to the accompanying figures, wherein.

DESCRIPTION OF EXEMPLARY EMBODIMENTS

Figure 1:
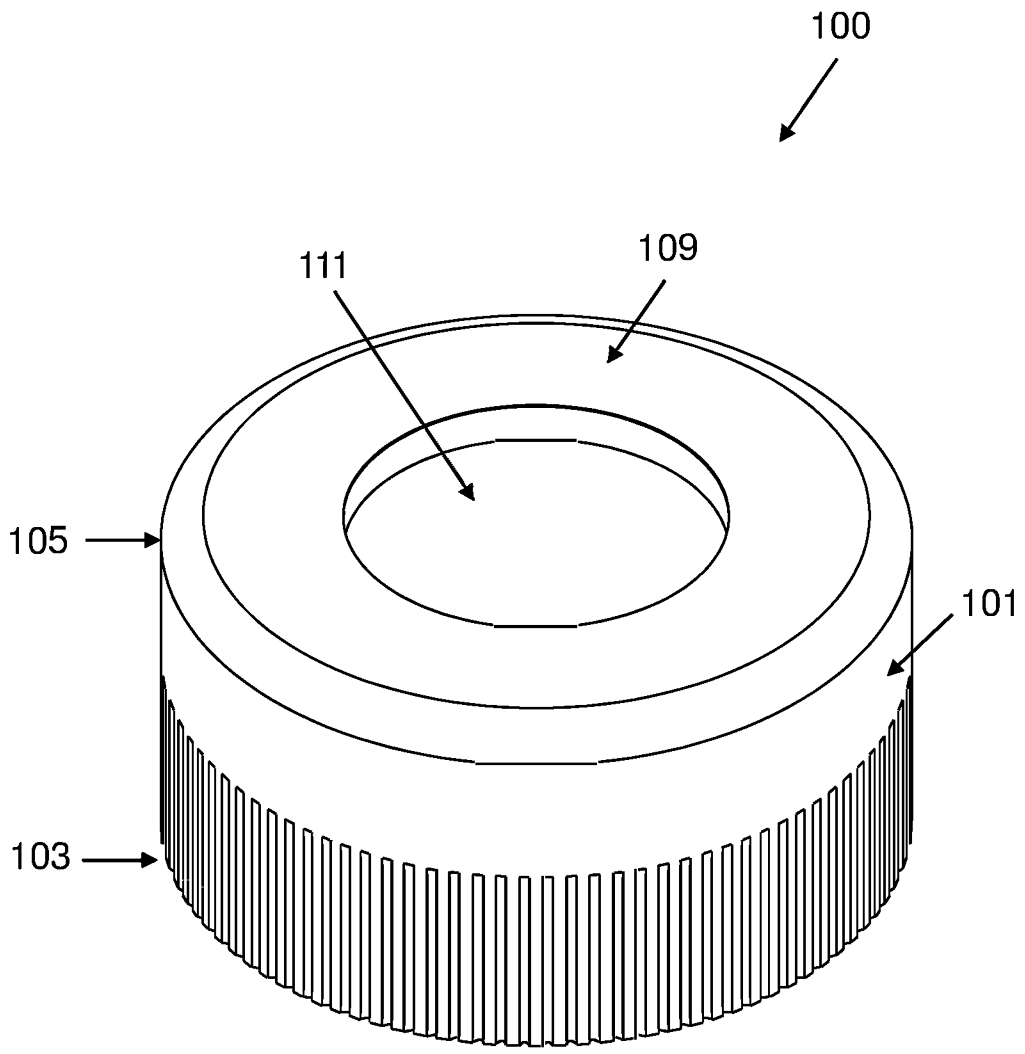
FIG. 1 illustrates a perspective view of an example vial cap for an LC sample vial, according to embodiments of the present disclosure.

The present disclosure relates to a cap for a sample vial for use in LC workflows. The vial cap in the present disclosure combines the benefits of twist caps and push caps by utilizing internal threads or ridges formed of a soft, flexible material. The threads can deform when the cap is pushed onto a vial, and they conform to the matching threads of the vial to form a secure seal. The threads of the cap can be further shaped to assist the push-down action. In some embodiments, the flexible cap threads can be formed of the same material as the cap septum, or as an integrated component with the septum. In other embodiments, the threads and the septum can be different materials. If the cap needs to be removed, it can be either pulled off directly or rotated and twisted off as a regular twist cap.

According to some embodiments, the cap includes three distinct components: a cap body, a number of flexible threads or ridges configured to engage with portions of a sample vial, and a septum. In some embodiments, the cap body can include a cylindrical sidewall and a lid portion, and it can be formed from hard resin for structural integrity. The flexible threads or ridges can include a series of parallel threads, or other features that extend radially inward from the inside surface of the cap body, regardless of geometry. For simplicity, the present disclosure discusses threads or ridges, although other geometries can be used as long as they are capable of engaging with features on the mouth or neck of a sample vial.

In some embodiments, the lid portion of the cap body can define an opening that allows access to the interior of the sample vial, and this opening can be covered by the septum. The septum is located in the interior of the cap body, and can be formed of the same material as the flexible threads, in some embodiments. In other embodiments, the threads can be made of a more flexible material than the septum. In some embodiments, the septum and the threads can be bonded to the interior of the cap body.

In some embodiments, the flexible threads can include two or more annular parallel threads that go around the interior surface of the cap body. There can be gaps between sets of parallel threads to allow for the threads to more easily engage with spiraled threads on the mouth of a sample vial, in some embodiments. The gaps can form two, three, or more sets of parallel threads disposed around the interior surface of the cap body. The number of threads, geometry of the threads, and spacing between the threads can be designed to enhance flexibility and facilitate the push-down action of the cap onto the sample vial. The parallel threads can be parallel to the septum, in some embodiments. In some embodiments, the septum can be a fluoropolymer or bonded polymer layers.

In some embodiments, the flexible threads or ridges can have different cross sectional geometries. For example, the flexible threads can have a tapered or barb shape that is angled in order to facilitate placement of the cap onto the sample vial. In some embodiments, the flexible threads can have a rounded cross sectional geometry. In some embodiments, an internal air pocket can be formed within the flexible threads in order to enhance flexibility.

FIG. 1 illustrates a perspective view of an example vial cap 100 for an LC sample vial, according to embodiments of the present disclosure. In this embodiment, the vial cap 100 includes a cylindrical sidewall or cap body 101. The cylindrical cap body 101 has a first end 103 and a second end 105, and a cap lid portion 109 extends radially inward from the second end 105 of the cylindrical cap body 101. The cap lid portion 109 defines a circular opening located at the central axis of the vial cap 100, and a septum 111 spans the opening in the cap lid portion. In some embodiments, the cap body 101 includes a number of ridges or grips to aid in placing or removing the cap 100.

Figure 2:
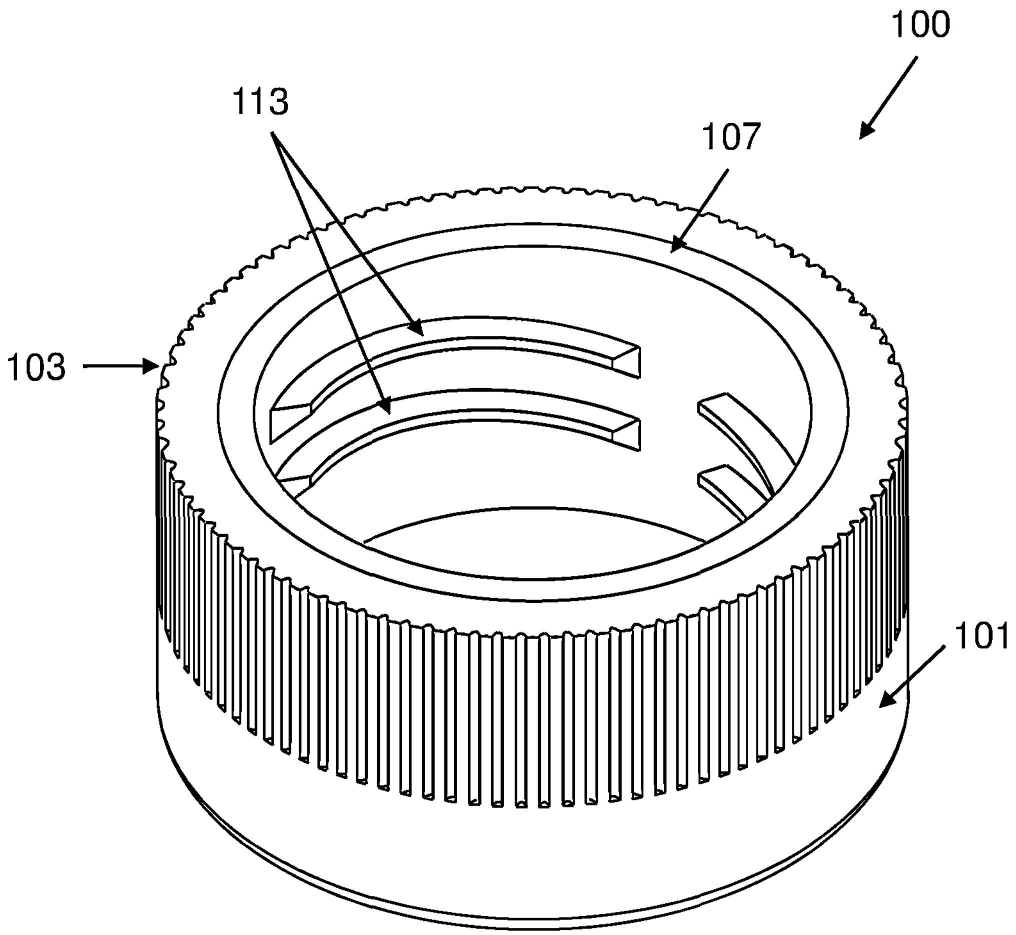
FIG. 2 illustrates a perspective view of the example vial cap of FIG. 1 inverted, according to embodiments of the present disclosure.

FIG. 2 illustrates a perspective view of the example vial cap 100 of FIG. 1 inverted, according to embodiments of the present disclosure. In this embodiment, the vial cap 100 has been inverted in order to more clearly view the first end 103 of the cylindrical cap body 101, as well as the interior of the vial cap 100. The first end 103 of the cylindrical cap body 101 defines a first circular opening 107, and within the vial cap 100 a plurality of flexible threads 113 or fastening features extend radially inward from an internal surface of the cylindrical cap body 101. The first circular opening 107 can have the dimensions to receive the mouth of a sample vial. In some embodiments, the vial cap 100 includes a first circular opening 107 that is capable of receiving the mouth of a 12×32 mm size sample vial. These flexible threads 113 are configured to engage with the external threads of a sample vial. In some embodiments, the flexible threads 113 can engage with any type of sample vial, whether it was originally designed for use with a twist cap or a push-on cap. In this example embodiment, the threads 113 include a number of sets of parallel threads, although more or less threads can be used, in alternative embodiments.

Figure 3:
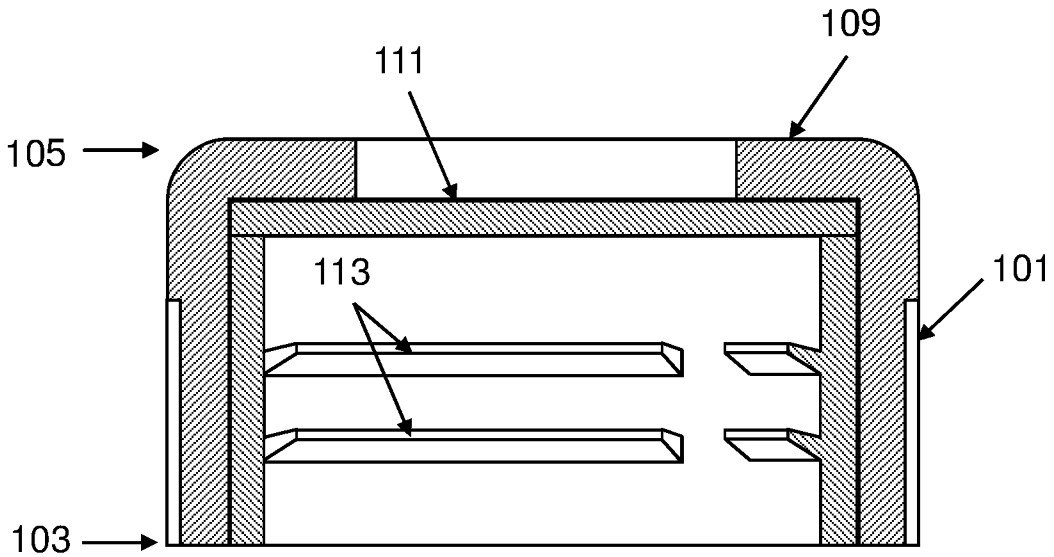
FIG. 3 illustrates a cross sectional view of the vial cap of FIG. 1, according to embodiments of the present disclosure.

FIG. 3 illustrates a cross sectional view of the vial cap of FIG. 1, according to embodiments of the present disclosure. In this embodiment, the cap lid portion 109 can be seen extending radially inward from the second end 105 of the cylindrical cap body 101. The cap lid portion 109 defines an opening, and the septum 111 is located within the cylindrical cap body 101 and in contact with the inner surface of the cap lid portion 109. The septum 111 spans the circular opening defined by the cap lid portion 109. In some embodiments, the septum 111 is a flexible plastic material, and it may come with one or more slits located at or near the central axis of the cap in order to allow a user to more easily access the contents of the sample vial without puncturing the septum 111. In some embodiments, the septum 111 can be a fluoropolymer or bonded polymer layers. In this embodiment, the sets of parallel threads 113 can be seen extending radially inward from the inner surface of the cylindrical cap body 101.

In the embodiment shown in FIG. 3, sets of two parallel threads 113 are disposed around the inner circumference of the cylindrical cap body 101, although more than two parallel threads can be used in other embodiments. The number of parallel threads 113 can depend on a number of the external threads on the mouth of the sample vial, in some cases. In some embodiments, the distance between each thread can be based on the size or geometry of the threads of the sample vial, or the geometry of the sample vial mouth. In some embodiments, each of the parallel threads 113 are parallel to a plane in which the septum lies. In other words, unlike threads of a twist cap that must be inclined or spiraling around the inner surface of the cap, the parallel threads 113 in this disclosure are parallel to the septum, or parallel to the plane of the first circular opening at the first end 103 of the cylindrical cap body 101.

Figure 4:
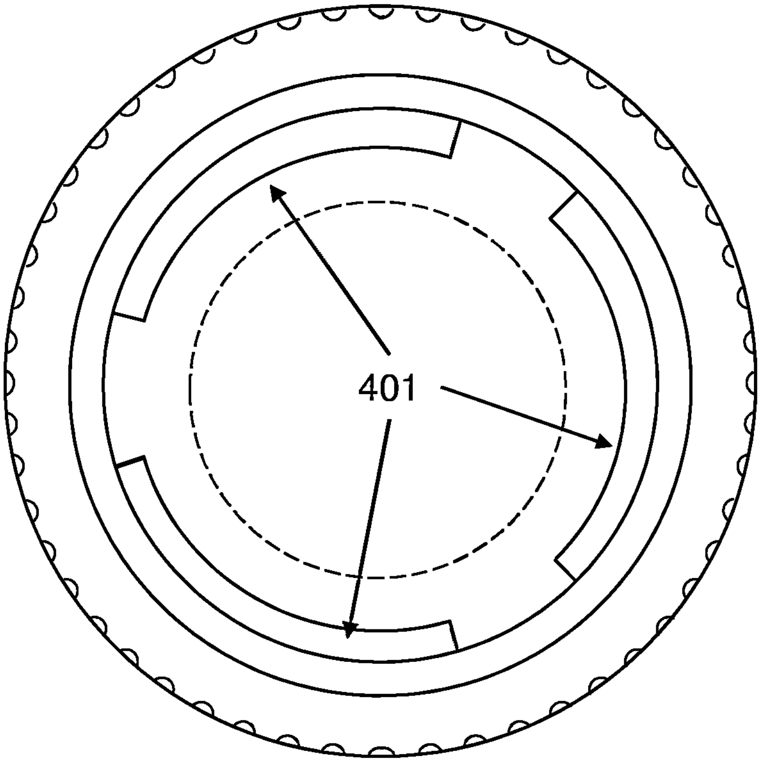
FIG. 4 illustrates a view of an example vial cap looking through the first circular opening of the vial cap, according to embodiments of the present disclosure.

FIG. 4 illustrates a view of an example vial cap looking through the first circular opening of the vial cap, according to embodiments of the present disclosure. In this figure, it can be seen that there are three sets 401 of parallel threads (labeled 113 in FIG. 3) extending radially inward and disposed around the inner circumference of the cylindrical cap body. In this embodiment, gaps can be defined between the three sets 401 of parallel threads, and the sets 401 of parallel threads can be uniformly distributed around the cap body. In alternative embodiments, there can be only two sets of threads, or more than three sets of threads disposed around the inner circumference of the cylindrical cap body.

Figure 5:
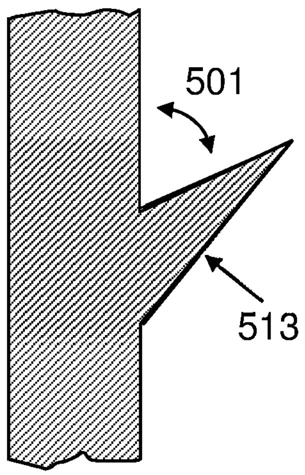
FIG. 5 illustrates a cross sectional view of an example geometry of the plurality of flexible threads, according to embodiments of the present disclosure.

FIG. 5 illustrates a cross sectional view of an example geometry of a flexible thread 513, according to embodiments of the present disclosure. In some embodiments, the geometry shown in FIG. 5 can be utilized in one or more of the threads 113 shown above in FIG. 3. In this embodiment, each of the threads 513 has a tapered cross sectional geometry as it extends radially inward. In some embodiments, the angle 501 formed between a surface of the thread 513 and the internal surface of the cylindrical cap body depends on a geometry of the external threads of the sample vial. In other embodiments, the tapered or pointed thread 513 can be angled in order to help secure the cap to the sample vial, or to make pressing the cap onto the sample vial more easy. In some embodiments, a length of the thread 513, or a distance which the thread protrudes radially inward, depends on the height or geometry of the threads on the mouth of the sample vial, or the geometry of the mouth and/or neck of the sample vial. For example, if the sample vial includes a large feature originally designed to mate with a push-on cap, or if the sample vial includes threads with deep ridges originally designed to mate with a twist cap, the flexible thread 513 may extend further away from the internal surface of the cylindrical cap body. In some embodiments, the barb shape of the thread 513 shown in FIG. 5 can be designed to enhance flexibility and assist in the push-down action of securing the cap to the sample vial.

Figure 6:
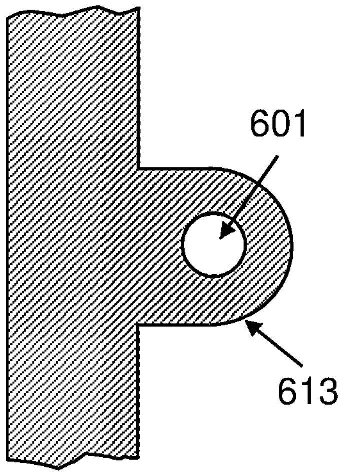
FIG. 6 illustrates a cross sectional view of another example geometry of the plurality of flexible threads, according to embodiments of the present disclosure.

FIG. 6 illustrates a cross sectional view of another example geometry of a flexible thread 613, according to embodiments of the present disclosure. In some embodiments, the geometry shown in FIG. 6 can be utilized in one or more of the threads 113 shown above in FIG. 3. In this embodiment, each of the threads 613 defines a rounded cross sectional geometry as it extends radially inward. This particular rounded thread 613 also defines an air pocket 601, which allows the thread 613 to be more easily deformed when pushing the cap onto the sample vial. In some embodiments, the air pocket 601 can be an internal air pocket that is completely surrounded by the flexible material, as shown in FIG. 6. In other embodiments, the air pocket may not be completely surrounded by the flexible material and may be open and appear more like a cup formed within the flexible material. The size of the air pocket 601 can depend, for example, on the size or geometry of the features on the mouth of the sample vial, or on the rigidity or flexibility of the material used to form the thread 613. In some embodiments, a length of the thread 613, or a distance which the thread protrudes radially inward, depends on the height or geometry of the threads on the mouth of the sample vial, or the geometry of the mouth and/or neck of the sample vial. For example, if the sample vial includes a large feature originally designed to mate with a push-on cap, or if the sample vial includes threads with deep ridges originally designed to mate with a twist cap, the flexible thread 613 may extend further away from the internal surface of the cylindrical cap body.

Figure 7:
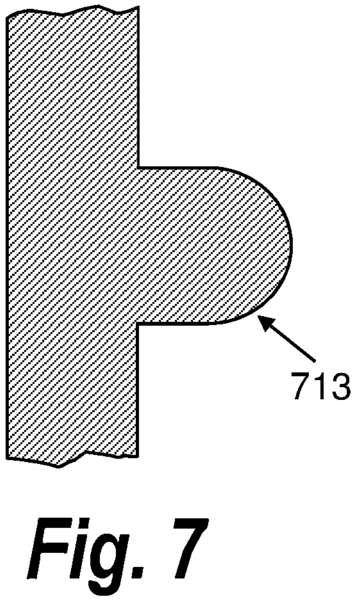
FIG. 7 illustrates a cross sectional view of another example geometry of the plurality of flexible threads, according to embodiments of the present disclosure.

FIG. 7 illustrates a cross sectional view of another example geometry of a flexible thread 713, according to embodiments of the present disclosure. In some embodiments, the geometry shown in FIG. 7 can be utilized in one or more of the threads 113 shown above in FIG. 3. In this embodiment, each of the threads 713 defines a rounded cross sectional geometry as it extends radially inward. Unlike the embodiment shown in FIG. 6, there is no internal air pocket within the thread 713. Depending on the material used, this can result in a more rigid thread than the one shown in FIG. 6. In some embodiments, a length of the thread 713, or a distance which the thread protrudes radially inward, depends on the height or geometry of the threads on the mouth of the sample vial, or the geometry of the mouth and/or neck of the sample vial. For example, if the sample vial includes a large feature originally designed to mate with a push-on cap, or if the sample vial includes threads with deep ridges originally designed to mate with a twist cap, the flexible thread 713 may extend further away from the internal surface of the cylindrical cap body.

Figure 8:
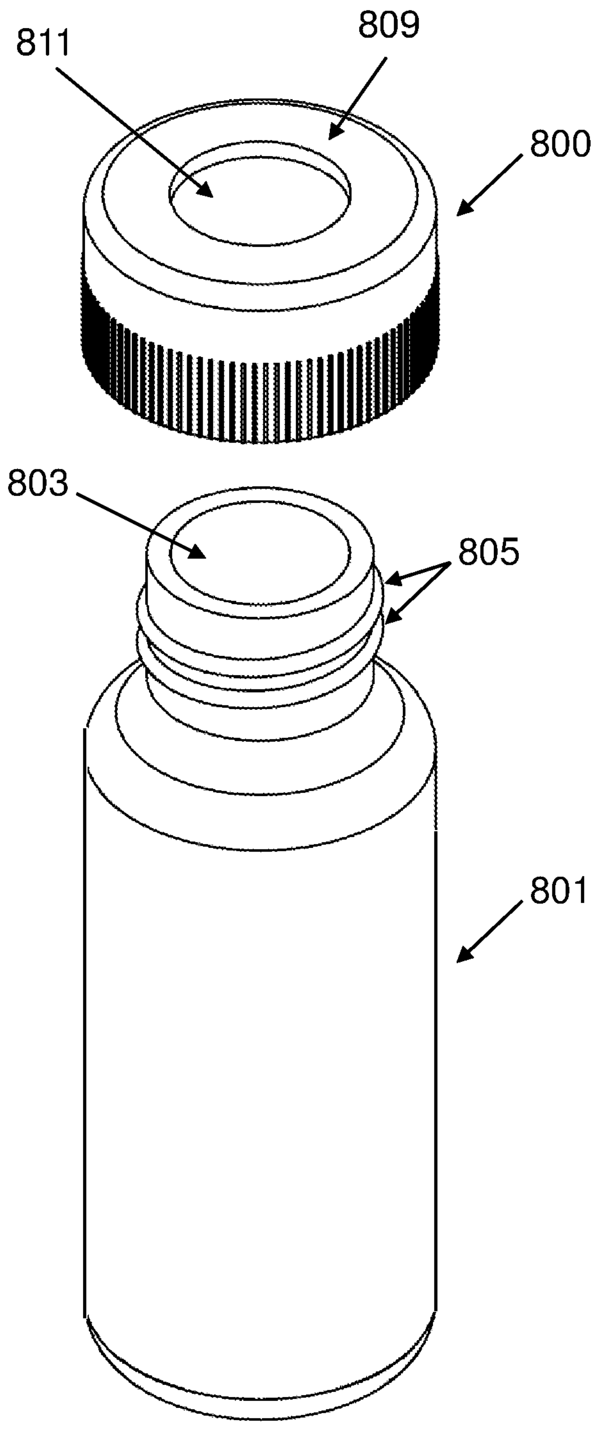
FIG. 8 illustrates an exploded view of an example vial cap and sample vial, according to embodiments of the present disclosure.

FIG. 8 illustrates an exploded view of an example vial cap 800 and sample vial 801, according to embodiments of the present disclosure. In this embodiment, the sample vial 801 was originally designed for a twist cap and includes a number of external threads 805 extending radially outward from the mouth 803 of the sample vial 801. The vial cap 800, as discussed above, includes a number of flexible threads or ridges that are configured to engage with the external threads 805 of the sample vial 801 when the vial cap 800 is placed on the sample vial 801. In this embodiment, the vial cap 800 includes a cap lid portion 809 that extends radially inward and defines an opening that is covered by a septum 811. In some embodiments, the septum can have one or more slits in order to more easily allow access to the interior of the sample vial 801.

In some embodiments, the number or shape or positioning of the internal flexible threads of the vial cap 800 depends on the number or geometry of the external threads 805 of the sample vial 801. For example, if the external threads 805 are wider, the spacing between the flexible threads of the vial cap 800 can be greater, and if the external threads 805 extend farther outward radially from the mouth of the sample vial 801, the flexible threads of the vial cap 800 can extend farther radially inward in order to properly engage with the external threads 805 of the sample vial 801. Because the external threads 805 of the sample vial 801 are spiraled, when the cap 800 needs to be removed, a user can either pull the cap off directly or rotate the cap to twist it off.

In some embodiments, a vial cap according to the present disclosure can have a solid upper lid portion that does not have an exposed septum when viewed from above. For example, the cap body can include a rigid cylindrical sidewall defining a first circular opening configured to receive the mouth of a sample vial. The cap can also include flexible ridges extending radially inward from the internal surface of the rigid cylindrical sidewall to engage with external threads extending radially outward from the mouth of the sample vial. In some embodiments, the geometry of the fastening features can be designed to prevent the vial cap from falling off the sample vial.

While exemplary embodiments have been described herein, it is expressly noted that these embodiments should not be construed as limiting, but rather that additions and modifications to what is expressly described herein also are included within the scope of the technology. Moreover, it is to be understood that the features of the various embodiments described herein are not mutually exclusive and can exist in various combinations and permutations, even if such combinations or permutations are not made express herein, without departing from the spirit and scope of the technology.

What is claimed is:

1. A vial cap comprising:

a cylindrical cap body defining a first circular opening at a first end;

a cap lid portion extending radially inward from a second end of the cylindrical cap body, the cap lid portion defining a second circular opening;

a septum located within the cylindrical cap body and in contact with the cap lid portion, the septum spanning the second circular opening defined by the cap lid portion; and a plurality of flexible threads extending from an internal surface of the cylindrical cap body, wherein each of the plurality of flexible threads defines an air pocket.

2. The cap of claim 1, wherein the plurality of flexible threads includes at least two parallel threads.

3. The cap of claim 2, wherein the at least two parallel threads are parallel to a plane in which the septum lies.

4. The cap of claim 2, wherein the at least two parallel threads include two pairs of parallel threads displaced around the internal surface of the cylindrical cap body.

5. The cap of claim 2, wherein the at least two parallel threads include more than two pairs of parallel threads displaced around the internal surface of the cylindrical cap body.

6. The cap of claim 2, wherein the at least two parallel threads are configured to engage with external threads extending from a mouth of a vial when the first circular opening of the cylindrical cap body is positioned over the mouth of the vial.

7. The cap of claim 6, wherein a spacing between parallel threads depends on a size of the external threads extending from the mouth of the vial.

8. The cap of claim 6, wherein each of the plurality of flexible threads has a tapered cross sectional geometry as they extend radially inward, and an angle formed between a tapered surface of the plurality of flexible threads and the internal surface of the cylindrical cap body depends on a geometry of the external threads extending from the mouth of the vial.

9. The cap of claim 1, wherein each of the plurality of flexible threads has a tapered cross sectional geometry as they extend radially inward.

10. The cap of claim 1, wherein each of the plurality of flexible threads has a rounded cross sectional geometry.

11. The cap of claim 1, wherein the septum and the plurality of flexible threads are formed from a single material.

12. The cap of claim 1, wherein the plurality of flexible threads are formed from a material different from the septum.

13. The vial cap of claim 1, wherein the septum is bonded to the internal surface of the cylindrical cap body.

14. The vial cap of claim 1, wherein the septum comprises one or more slits.

* * * * *